United States Patent [19]

Wiest et al.

[11] 4,322,516
[45] Mar. 30, 1982

[54] COPOLYMERS FOR PRESSURE-SENSITIVE ADHESIVES BASED ON ACRYLIC ESTERS, (METH)ACRYLAMIDE VINYL ACETATE AND ETHYLENE

[75] Inventors: Hubert Wiest; Rudolf Weissgerber; Erwin Lieb, all of Burghausen, Fed. Rep. of Germany

[73] Assignee: Wacker-Chemie GmbH, Munich, Fed. Rep. of Germany

[21] Appl. No.: 131,785

[22] Filed: Mar. 19, 1980

[30] Foreign Application Priority Data

Apr. 19, 1979 [DE] Fed. Rep. of Germany ....... 2915887

[51] Int. Cl.$^3$ ............................................. C08F 210/02
[52] U.S. Cl. ................................. 526/307.7; 428/355; 526/304; 526/306; 526/307.8
[58] Field of Search ...................... 526/303, 304, 306; 428/355

[56] References Cited

U.S. PATENT DOCUMENTS

| | | | |
|---|---|---|---|
| 3,380,851 | 4/1968 | Lindemann et al. | 526/304 |
| 3,451,982 | 6/1969 | Mortimer | 526/303 |
| 3,870,673 | 3/1975 | Rauterkus | 526/304 |
| 3,971,690 | 7/1976 | Birnkraut et al. | 526/303 |
| 4,032,692 | 6/1977 | Birnkraut et al. | 526/303 |
| 4,044,197 | 8/1977 | Wiest et al. | 526/304 |
| 4,073,779 | 2/1978 | Wiest et al. | 526/303 |
| 4,129,472 | 12/1978 | Hobes et al. | 526/303 |

*Primary Examiner*—Harry Wong, Jr.
*Attorney, Agent, or Firm*—Hammond & Littell, Weissenberger and Muserlian

[57] ABSTRACT

A copolymer having good properties for use as a pressure-sensitive adhesive from an aqueous dispersion comprising:
(a) from 10% to 30% by weight of ethylene units,
(b) from 29% to 69% by weight of acrylic ester units,
(c) from 20% to 55% by weight of vinyl acetate units,
(d) from 0.2% to 8% by weight of (meth)acrylamide units, and
(e) from 0 to 12% of other olefinically-unsaturated monomer units copolymerizable with the above, said copolymer having a glass transition temperature of from $-20°$ C. to $-60°$ C. and a K-value according to Fikentscher, measured in tetrahydrofuran, of from 50 to 180; as well as processes to make the same and aqueous dispersions of the same for use as pressure-sensitive adhesives.

10 Claims, No Drawings

COPOLYMERS FOR PRESSURE-SENSITIVE ADHESIVES BASED ON ACRYLIC ESTERS, (METH)ACRYLAMIDE VINYL ACETATE AND ETHYLENE

BACKGROUND OF THE INVENTION

Numerous copolymers of all possible compositions and all possible applications are known. Depending on which of the many known monomers are copolymerized, the properties of the resulting polymer can be influenced. The amount in which the individual monomers are used in relation to other monomers plays a definite part in this respect. For example, ethylene/vinyl ester copolymers, ethylene/acrylic ester copolymers and also terpolymers of various compositions are known. Typical applications for such products are as textile finishing agents, paper coating agents, and binders for paints and adhesives. When using ethylene/vinyl acetate and ethylene/acrylic ester copolymers as pressure-sensitive adhesives it is necessary additionally to use tackifying resins. Such combinations have a tendency, however, to age and become brittle and the tackifying portion has a tendency to migrate into porous substrates.

OBJECTS OF THE INVENTION

An object of the present invention is to develop, from the wide range of known monomers, an accurately defined novel copolymer which has, in particular, good properties for use as a pressure-sensitive adhesive.

Another object of the present invention is the development of a copolymerizate containing:
(a) from 10% to 30% by weight of ethylene units,
(b) from 29% to 69% by weight of units of an acrylic acid ester with an alkanol having from 4 to 12 carbon atoms,
(c) from 20% to 55% by weight of vinyl acetate units,
(d) from 0.2 to 8% by weight of monomeric units having the formula:

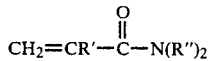

wherein R' is a member selected from the group consisting of hydrogen and methyl, and R" is a member selected from the group consisting of hydrogen, alkyl having from 1 to 3 carbon atoms, hydroxyalkyl having from 1 to 3 carbon atoms, alkoxyalkyl having from 1 to 3 carbon atoms, alkanoylalkyl having from 3 to 6 carbon atoms, alkanoylamidoalkyl having from 3 to 6 carbon atoms and alkenoyl aminoalkyl having from 4 to 7 carbon atoms, and
(e) from 0 to 12% by weight of other olefinically-unsaturated monomeric units copolymerizable with ethylene, vinyl acetate and alkyl acrylate, and monomers as described in (d), said copolymerizate having a glass transition temperature of from −20° C. to −60° C. and a K-value according to Fikentscher measured in tetrahydrofuran, of from 50 to 180.

A further object of the present invention is the development of processes for the production of the above copolymerizate.

A still further object of the present invention is to develop a pressure-sensitive adhesive dispersion consisting essentially of:
from 40% to 65% by weight, based on the dispersion, of the above copolymerizate in finely-divided form,
from 1.5% to 8% by weight, based on the weight of the copolymerizate of emulsifiers and/or protective colloids, and
from 34% to 59% by weight based on the dispersion, of water.

These and other objects of the present invention will become more apparent as the description thereof proceeds.

DESCRIPTION OF THE INVENTION

The invention provides a copolymerizate consisting of:
(a) 10% to 30% by weight of ethylene units,
(b) 29% to 69% by weight of units of acrylic acid esters of alcohols having from 4 to 12 carbon atoms,
(c) 20% to 55% by weight of vinyl acetate units,
(d) 0.2% to 8% by weight of monomer units of the general formula:

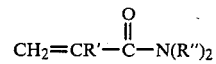

in which R'=H or CH$_3$ and R"=H or, optionally, substituted alkyl having from 1 to 3 carbon atoms,
(e) 0 to 12% by weight of other olefinically-unsaturated monomer units copolymerizable with the above, said copolymerizate having a glass transition temperature of −20° C. to −60° C. and a K-value, according to Fikentscher measured in tetrahydrofuran, of 50 to 180.

More particularly, the present invention relates to a copolymerizate containing:
(a) from 10% to 30% by weight of ethylene units,
(b) from 29% to 69% by weight of units of an acrylic acid ester with an alkanol having from 4 to 12 carbon atoms,
(c) from 20% to 55% by weight of vinyl acetate units,
(d) from 0.2 to 8% by weight of monomeric units having the formula:

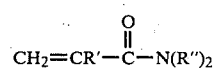

wherein R' is a member selected from the group consisting of hydrogen and methyl, and R" is a member selected from the group consisting of hydrogen, alkyl having from 1 to 3 carbon atoms, hydroxyalkyl having from 1 to 3 carbon atoms, alkoxyalkyl having from 1 to 3 carbon atoms, alkanoylalkyl having from 3 to 6 carbon atoms, alkanoylamidoalkyl having from 3 to 6 carbon atoms, and alkenoylamidoalkyl having from 4 to 7 carbon atoms, and
(e) from 0 to 12% by weight of other olefinically-unsaturated monomeric units copolymerizable with ethylene, vinyl acetate and alkyl acrylate and monomers as described in (d), said copolymerizate having a glass transition temperature of from −20° C. to −60° C. and a K-value according to Fikentscher, measured in tetrahydrofuran, of from 50 to 180.

The invention further provides an aqueous pressure-sensitive adhesive dispersion containing:
from 40% to 65% by weight, based on the dispersion, of the copolymerizate described above,
from 1.5% to 8% by weight, based on the copolymerizate, of emulsifiers and/or protective colloids, and
from 34% to 59% by weight, based on the dispersion, of water.

The copolymerizate according to the invention has properties which indicate its excellent suitability for use as a pressure-sensitive adhesive. In particular, the influence of component (d) on the total copolymer produces these properties. The pressure-sensitive adhesives made from these copolymers have a very strong cohesion, that is to say, splitting within the adhesive layer does not occur. In addition, the necessary outstanding adhesive properties and adhesion properties are present to a high degree. The copolymers also have the desired resistance to aging. It must be regarded as unexpected that the incorporation by polymerization of small amounts of component (d) has such a favorable effect on the properties of the total copolymer.

The copolymers are manufactures by free-radical-initiated polymerization, in an autoclave, of components (b), (c), (d) and (e) in the specified amounts under an ethylene pressure of from 20 to 120 bar at 10° to 100° C. In principle, the polymerization can be carried out in bulk or in solution but is preferably carried out in an aqueous emulsion.

The acrylic acid esters of alcohols, such as alkanols having from 4 to 12 carbon atoms are suitable as component (b). Preferably, alkanols having from 6 to 10 carbon atoms are used, and especially the inexpensive 2-ethylhexyl acrylate. Other examples of such acrylic acid esters are butyl acrylate, hexyl acrylate, heptyl acrylate, octyl acrylate, n-decyl acrylate and dodecyl acrylate. The amounts by weight used range from 29% to 69% by weight, preferably from 29% to 60% by weight. Vinyl acetate, component (c), is incorporated by polymerization in amounts ranging from 20% to 55% by weight, preferably in amounts ranging from 25% to 50% by weight.

Component (d), the (meth)acrylamide, is defined by the general formula. It comprises, chemically, acrylic acid amides or methacrylic acid amides. Preferably, the acrylamide or methacrylamide is not substituted. However, both may be substituted on the nitrogen atom by alkyl radicals having up to 3 carbon atoms, e.g., methyl, ethyl or propyl. These alkyl radicals may also be substituted, however, for example, by hydroxyl groups, such as $-CH_2OH$, or ether groups, such as $-CH_2OCH_3$, N-acyl groups, for example,

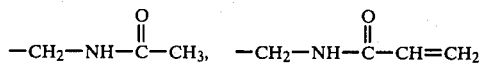

or alkylketone groups, such as

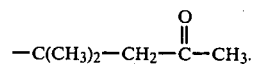

of the two hydrogen atoms on the acrylamide or methacrylamide, preferably only one is substituted. Generally, however, both may be substituted by identical or different substituents. The amounts of the (meth)acrylamide component (d) used normally range from 0.2% to 8% by weight, preferably from 0.2% to 3% by weight.

The components (b), (c) and (d) polymerize almost quantitatively into the copolymer, so that the amount of them used reappears in full in the copolymer. The amount of component (a), ethylene, is controlled by the application of the pressure. Generally, pressures between 20 and 120 bar are used. The preferred range for the ethylene unit content is from 12% to 25% by weight.

Other monomers [component (e)] can be used in addition to these four monomers so far described, and can be employed in amounts of from 0 to 12% by weight. If employed they are preferably present in amounts of from 0.5% to 8% by weight. These additional monomers can basically be divided into three groups. The first group includes monomers miscible with water in any ratio. Preference is given to $\alpha,\beta$-unsaturated carboxylic acids, especially $\alpha,\beta$-alkenoic acids having from 3 to 6 carbon atoms and their water-soluble salts, such as acrylic acid and methacrylic acid and salts thereof. Crotonic acid may also be used in this connection. Further examples of water-soluble monomers are vinyl sulfonic acid and its water-soluble salts, N-vinyl-N-methylacetamide and especially N-vinylpyrrolidone. These compounds are preferably employed in amounts of from 0 to 8% by weight.

The second group of monomers that may be used as component (e) are multiple olefinically-unsaturated monomers, such as, for example, diallyl adipate, triallyl cyanurate, butanediol diacrylate and allyl methacrylate. They are preferably used in amounts ranging from 0 to 2% by weight.

The third group of component (e) are the monomer-soluble monomers. Examples are vinyl ethyl ether, styrene, lower alkyl methacrylates, such as methyl methacrylate, glycidyl (meth)acrylate, hydroxyethyl acrylate and hydroxypropyl acrylate, vinyl chloride and vinylidene chloride. The monomers of this group are employed in amounts of from 0 to 8% by weight.

The monomers (e) are generally used in amounts ranging from 0 to 12% by weight. Monomers already listed under (a) to (d) are not included here.

The polymerization is carried out in conventional autoclaves. In this process, all of the monomers may be introduced initially or only part may be introduced initially and the remainder may be metered in. Preferably, comonomers such as the acrylic acid esters, which are rapidly incorporated into the polymer, are metered in after a delay. The ethylene pressure at from 20 to 120 bar may be held constant throughout the polymerization at from 20 to 120 bar by the pressure of additional ethylene introduced, or it may be varied. These general measures apply to all types of polymerization.

In solution polymerization, solvents, such as, for example, alcohols having from 1 to 5 carbon atoms, esters, ketones, toluene, xylene, liquid hydrocarbons and mixtures thereof, may be used. As free-radical-initiators (0.05% to to 3% by weight), there may be mentioned in this connection azo or peroxidic compounds, for example, azoisobutyronitrile, lauryl peroxide, t.-butyl hydroperoxide, t.-butyl perpivalate, benzoyl peroxide, diisopropyl peroxydicarbonate and also redox systems which additionally contain a reducing agent, such as amines, hydrazines or sulfinic acids. The same radical initiators are also suitable for bulk polymerization.

Preferably, however, the copolymerization is manufactured by the polymerization in an autoclave of components (b) to (e) in the specified amounts in an aqueous emulsion in the presence of from 1.5% to 8% by weight, based on the monomers, of emulsifiers and/or protective colloids, and also free-radical initiators, under an ethylene pressure ranging from 20 to 120 bar and at a temperature ranging from 10° to 90° C.

In this emulsion polymerization, all of component (d) is preferably present in the autoclave prior to the commencement of polymerization.

The dispersions produced generally have a solid content of 40% to 65% by weight. Dispersing agents may be any emulsifiers and protective colloids normally used in emulsion polymerization. It is possible to use either protective colloids on their own, or emulsifiers on their own, and also mixtures of emulsifiers with protective colloids. The total amount of emulsifiers and protective colloids is usually from 1.5% to 8% by weight, based on the monomers.

Examples of protective colloids that may be mentioned are polyvinyl alcohol, partially acetylated polyvinyl alcohols, water-soluble cellulose derivatives, such as hydroxyethylcellulose, hydroxypropylcellulose, methylcellulose or carboxymethylcellulose; water-soluble starch ethers; polyacrylic acid or water-soluble polyacrylic acid copolymers with (meth)acrylamide and/or acrylic acid esters; poly-N-vinyl compounds of acyclic or cyclic carboxylic acid amides. The amounts generally range from 1.5% to 6% by weight, based on the polymerizate.

As emulsifiers there may be used anionic, cationic and nonionic wetting agents in amounts ranging from 1.5% to 6% by weight, based on the polymerizate. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of alkyl and alkylaryl polyethoxyalkanols and sulfosuccinic acid esters. The cationic emulsifiers which can be used are, for example, alkyl ammonium salts, alkyl phosphonium salts and alkyl sulfonium salts.

Examples of suitable nonionic emulsifiers are the addition products of 5 to 50 mols of ethylene oxide onto straight-chain or branched-chain alkanols having from 6 to 22 carbon atoms, onto alkylphenols, onto higher fatty acids, onto higher fatty acid amides, and onto primary and secondary higher fatty amines, as well as block copolymers of propylene oxide with ethylene oxide.

As emulsifiers, preferably nonionic and/or anionic emulsifiers are used in amounts ranging from 1.5% to 6% by weight, based on the polymerizate, alone or in admixture with protective colloids, preferably in amounts of from 0.5% to 4% by weight. The dispersing agents can be metered in or can be present at the start.

The pH during the polymerization is kept between a pH of 2 and 7, preferably between a pH of 3 and 5. For this purpose, acids, for example, formic acid, acetic acid, hydrochloric acid and sulfuric acid, or bases, for example, ammonia, amines, sodium hydroxide, potassium hydroxide and calcium hydroxide, or customary buffer salts, for example, alkali metal acetates, alkali metal carbonates and alkali metal phosphates, may be added.

The free-radical initiators used are the customary completely or partially water-soluble catalysts, especially peroxidic compounds, in amounts ranging from 0.02% to 2% by weight, based on the monomer content.

Examples of such free-radical initiators are hydrogen peroxide, sodium persulfate, potassium persulfate and ammonium persulfate, and also tert.-butylhydroperoxide, azo-bis-(2-amidinopropane)-hydrochloride, or azo-bis-(2-cyanovaleric acid). They may be used alone or together with reducing agents in amounts ranging from 0.02% to 2% by weight, based on the monomer, for example, formaldehyde sodium sulfoxylate, iron (II) salts, sodium dithionate, sodium hydrogen sulfite, sodium sulfite, sodium thiosulfate or amines as the redox catalysts.

Furthermore, also suitable is the redox catalyst system described in German Pat. No. 1,133,130, German Pat. No. 1,745,567, and U.S. Pat. No. 3,563,963, consisting of noble metal sols of Group VIII of the Periodic Table of Elements, inorganic or organic peroxides, and hydrogen as the reducing agent and, optionally, heavy metal ions.

Preferably, redox catalysts are used. The free-radical initiators can be present wholly or partially at the start of polymerization and the remainder can be metered in. Preferably, one or both redox catalyst components is/are metered in during polymerization.

In order to regulate the molecular weight, known polymerization regulators, for example, mercaptans, aldehydes or chlorohydrocarbons, may be added during polymerization.

The principal application of the copolymers according to the invention lies in their use as pressure-sensitive adhesives. Pressure-sensitive adhesives are mostly applied to a wide variety of carrier materials and used in the form of self-adhesive materials, for example, adhesive tapes or adhesive sheets. They must combine the properties of adhesiveness, cohesion and adhesion to the greatest possible extent. They are intended to adhere to a wide variety of substrates when subjected to gentle pressure with the fingers and to peel off the substrate to which they have been affixed without leaving traces of adhesive behind and, in some cases, even destroying the substrate. Stability on aging is also a requirement. The copolymers according to the invention have these properties to a high degree. They can be dissolved in bulk and inorganic solvents and may be used in aqueous emulsion as pressure-sensitive adhesives. The addition of customary additives for pressure-sensitive adhesives, up to 50% of the copolymer is frequently desirable. Examples of such additives are fillers, pigments, plasticizers and resins. Examples of fillers that may be considered are chalks, gypsum and barite; fine types of kaolin, mica powders and types of talc. Examples of pigments that may be used are titanium dioxide, zinc oxide and lithopone.

Suitable plasticizers are the so-called "monomer" plasticizers. These are particularly esters of carboxylic acids with alcohols having from 4 to 13 carbon atoms, and/or tert.-phosphoric acid esters having optionally substituted alkyl groups having from 2 to 10 carbon atoms, particularly haloalkyls, and/or optionally alkyl-substituted phenyl groups. Particularly preferred carboxylic acid esters are diesters of phthalic acid with alkanols having from 4 to 13, preferably from 4 to 8, carbon atoms, and also diesters of sebacic acid and adipic acid with alkanols having from 6 to 10 carbon atoms.

Particularly preferred tert.-phosphoric acid esters are, for example, tricresyl phosphate, dicresylphenyl phosphate, cresyl-diphenyl phosphate, triphenyl phosphate, xylenyl-diphenyl phosphate, dixylenyl-phenyl phosphate, tris(chloroethyl) phosphate, diphenyl-octyl phosphate, phenyl-dioctyl phosphate and trioctyl phosphate. The monomer plasticizers may, of course, be used alone or as a mixture.

The pressure-sensitive adhesives according to the invention may have other customary additives added to them, for example, colophony resins, colophony resin derivatives, cumarene resins, indene resins, phenol-formaldehyde resins and hydrocarbon resins, waxes, paraffin oils, solvents, pigments, other polymerization products and/or soluble dyestuffs. If desired, such additives are added in amounts preferably up to a total of about 25% by weight, more especially up to about 15% by weight, calculated on the final pressure-sensitive adhesive mixture.

Uses that may be mentioned are on adhesive tapes, adhesive sheets, self-adhesive carpets and polyvinyl chloride floor coverings, self-adhesive labels, self-adhesive assembly parts such as decorative strips and hooks. The pressure-sensitive adhesives are ordinarily applied to the carrier in amounts of from 5 to 100 gm/m$^2$.

EXAMPLES

In the following examples, details are given of the tack (surface stickiness), peel strength (adhesive power), and shear strength (cohesion) of coatings manufactured with the dispersions according to the invention.

The term "adhesive strips", which is used several times, means strips of flexible sheet-like carrier material coated with a film of a dispersion according to the invention.

The numerical data is based on the following methods of analysis.

A. Tack (Surface Stickiness)

An adhesive strip 20 cm long and 2.5 cm wide (carrier material:PVC containing polymer plasticizers, 0.1 mm thick) is clamped in the form of a "loop" in the upper jaw of a tensile-testing machine so that it hangs vertically with the layer of adhesive on the outside. A length of about 3 cm of the "loop" is then placed, without applying pressure, on a horizontally secured, carefully cleaned glass plate by moving the two jaws of the tensile-testing machine vertically together at a speed of 100 mm/min. At the same speed, the adhesive strip is then immediately pulled away from the surface of the glass. The highest force required for pulling away the "loop" serves as a measure of the surface stickiness.

The value given is the mean value from five separate measurements, a fresh adhesive strip and a fresh glass surface being used each time.

B. Peel Strength (Adhesive Power)

An adhesive strip 20 cm long and 2.5 cm wide is placed, starting from one end and for a length of about 12 cm and in such a way that no air bubbles form, on a carefully cleaned plate of V4A steel. By rolling five times (backwards and forwards) with a 2.2 kg steel roller covered with silicone rubber, the adhesive strip is pressed onto the steel plate. After storage in an air-conditioned room for 8 minutes or 24 hours at 23° C. and 50% relative atmospheric humidity, a 5 cm length of the adhesive strip is pulled off at a speed of 78 mm/min. at angle of 180°. The average force required for this is measured. The values given are mean values from five separate measurements in each case.

C. Shear Strength (Cohesion)

An area 2.5 cm×2.5 cm of a 5 cm long and 2.5 cm wide adhesive strip is placed on a carefully cleaned glass plate so that no air bubbles form and so that the remaining portion of the adhesive strip projects beyond the edge of the glass plate. The strip is pressed onto the place by rolling (five times backwards and forwards) with a 2.2 kg steel roller covered with silicone rubber. After a bonding duration of 8 minutes, the glass plate is secured in a holder at an angle of 2° to the vertical (in order to exclude definitely any peel forces) such that the free end of the adhesive strip points downwards. To this end of the adhesive strip, a weight of 2 kg is secured so that it hangs freely. The free end of the adhesive strip and the reverse of the glass plate form an angle of 178°. The time taken for the adhesive strip to detach itself from the glass plate under the pull of the weight is measured. The measurement is carried out in an air-conditioned room at 23° C. and 50% relative atmospheric humidity. The values given are mean values from three separate measurements.

For all measurements the adhesive dispersions tested were applied to the different carrier sheets with a doctor blade at a thickness such that after drying a uniform polymer layer of 24 to 26 gm/m$^2$ remains.

The glass surface used in the test was cleaned (in the order given) by mechanical removal of visible traces of dirt using water and, if desired, detergents, storage in fresh chromosulfuric acid, storage in a methylethylketone bath and in ethanol bath. V4A-surfaces were similarly cleaned (without storage in chromosulfuric acid).

Before using the test surfaces thus cleaned, the plates were kept for at least 48 hours in an air-conditioned room at 23° C. and 50% relative atmospheric humidity.

To determine the wet strength, a 0.1 mm thick adhesive strip of PVC containing polymer plasticizers was affixed to V4A-steel in analogy to the procedure for measuring the peel strength, and after the assembly had been stored for three days in water, the peel strength was measured at room temperature.

EXAMPLE 1

The reactor employed was 16-liter pressure reactor equipped with a stirrer, several dosing means, cooling and heating means, as well as a manometer and temperature measuring means. In this reactor, 200 gm of nonylphenyl polyethylene glycol ether with 20 mols of ethylene oxide units, 15 gm of sodium dodecylbenzenesulfonate, 30 gm of potassium persulfate, 100 gm of acrylic acid and 165 gm of acrylamide were dissolved in 4,000 gm of water. After deaerating with nitrogen, 2,000 gm of vinyl acetate and 3,000 gm of 2-ethylhexyl acrylate were added thereto under stirring. After displacing the nitrogen with ethylene, the reactor was heated to 50° C. and ethylene at a pressure of 50 bar was pressed in until the saturation equilibrium was obtained.

The polymerization was carried out by the addition, according to the rate of polymerization, of a solution of 15 gm of sodium formaldehyde sulfoxylate in 700 gm of water over the course of 5 hours. The ethylene pressure was reduced during the polymerization to 40 bar. The pressure was then released and the mixture was introduced into a 30-liter stirring vessel. The remaining ethylene was removed by stirring and the application of a slight vacuum. A stable plastics dispersion having a viscosity of 3,000 mPa.S and a solids content of 58% was obtained.

The K-value (according to Fikentscher, "Cellulose-chemie" [Cellulose Chemistry], Vol. 13, p. 58, 1932; measured in a 1% tetrahydrofuran solution) of the polymer was 88. The glass transition temperature was −42° C. The dispersion dries to a viscous, very sticky film.

Polymer Composition 1.6% acrylic acid
2.6% acrylamide
18.0% ethylene
31.1% vinyl acetate
46.7% 2-ethylhexyl acrylate.

The coating of 25μ dry thickness on a 100μ thick PVC sheet produced, when affixed to V4A-steel, the following test values:
Tack 3.9 N/2.5 cm;
Peel strength after 8 min. 7 N/2.5 cm,
Peel strength after 24 hrs. 12 N/2.5 cm,
Shear strength was 660 minutes,
Wet strength 7 N/2.5 cm. (N=Newton)

EXAMPLE 2

The process was carried out as in Example 1, but instead of 165 gm of acrylamide, 180 gm of methacrylamide were added, and a monomer mixture of 3,000 gm of vinyl acetate and 2,000 gm of octyl acrylate was added. The ethylene pressure was set to 75 atmospheres and was held at this level for 4 hours after the start of polymerization. A stable dispersion having a solids content of 60% was obtained. The K-value was 67. The glass transition temperature was −48° C. The dispersion forms a vicous, sticky film.

Polymer Composition 1.5% acrylic acid
2.7% methacrylamide
22.0% ethylene
44.3% vinyl acetate
29.5% octyl acrylate.

EXAMPLE 3

The process was carried out as in Example 1, but a monomer mixture of 2,000 gm of vinyl acetate and 1,000 gm of 2-ethylhexyl acrylate and 165 gm of acrylamide was present before the start of polymerization. Fifteen minutes after the start of polymerization, a further 2,000 gm of 2-ethylhexyl acrylate were added at a constant rate over the course of 2.5 hours. The dispersion was stable and had a solids content of 54%. The K-value was 85. The glass transition temperature was −41° C. The dispersion dried to a viscous, very sticky film.

Polymer Composition 1.6% acrylic acid
2.6% acrylamide
17.0% ethylene
31.5% vinyl acetate
47.3% 2-ethylhexyl acrylate.

A coating of 25μ dry thickness on a 100μ thick PVC sheet produced, when affixed to V4A-steel, the following test values:
Tack 5.8 N/2.5 cm
Peel strength after 8 min. 6 N/2.5 cm
Peel strength after 24 hrs. 17 N/2.5 cm
Shear strength was 420 minutes.

COMPARISON EXAMPLE A

The process was carried out as in Example 1, but no acrylamide was added. A stable plastics dispersion having a solids content of 55% by weight was obtained. The soft film formed on drying was very sticky. The K-value of the polymer was 91. The glass transition temperature was −45° C.

Polymer Composition 1.6% acrylic acid
18.0% ethylene
32.2% vinyl acetate
48.2% 2-ethylhexyl acrylate.

A coating of 25μ dry thickness on a 100μ thick PVC sheet produced, when affixed to V4A-steel, the following test values:
Tack 7.4 N 2.5 cm
Peel strength after 8 min. 8 N/2.5
Peel strength after 24 hrs. 15 N/2.5
Shear strength was only 80 minutes.

EXAMPLE 4

The process was carried out as in Example 3, but 30 gm of acrylamide were present before the start of the polymerization. 10 gm of allyl methacrylate were dissolved in the 2,000 gm of 2-ethylhexyl acrylate and metered in therewith. A stable dispersion was obtained. The glass transition temperature was −40° C. The dispersion dried to a viscous sticky film.

Polymer Composition 1.5% acrylic acid
0.5% acrylamide
17.0% ethylene
30.7% vinyl acetate
46.0% 2-ethylhexyl acrylate
0.15% allyl methacrylate.

EXAMPLE 5

In a reaction vessel as in Example 1, 100 gm of a sodium nonylphenol polyethylene glycol ether sulfate with 10 mols of ethylene oxide, 150 gm of a tridecyl polyethylene glycol ether with 15 mols of ethylene oxide, and 20 gm of acrylamide were dissolved in 4,000 gm of water. After rinsing with nitrogen, 2,500 gm of vinyl acetate and 600 gm of decyl acrylate were added, while stirring. After displacing the nitrogen with ethylene, the mixture was heated to 50° C. Ethylene was introduced under a pressure of 55 bar.

The polymerization was started by commencing simultaneous addition of a solution of 40 gm of ammonium persulfate in 400 gm of water and a solution of 20 gm of sodium formaldehyde sulfoxylate in 400 gm of water, the solutions being added over the course of four hours. Fifteen minutes after the start of polymerization, the metering in of 1,900 gm of decyl acrylate and a second addition of 180 gm of acrylamide in 300 gm of water were commenced, both additions being effected at a constant rate over a period of two hours. After 4.5 hours polymerization time, the reaction mixture was cooled, and the dispersion depressurized. A stable dispersion which dried to a viscous sticky film was obtained. The glass transition temperature of the polymer was −53° C., and the K-value was 85.

Polymer Composition:

3.3% acrylamide 13.5% ethylene
41.6% vinyl acetate
41.0% decyl acrylate.

EXAMPLE 6

In a reactor as described in Example 1, 3,600 gm of water, 5 gm of a sulfosuccinic acid monoester with an alkyl-($C_{12}$)-polyethylene glycol ether with 6 EO, disodium salt, 6 gm of sodium vinylsulfonate and 100 mg of iron ammonium sulfate were dissolved, and atmospheric oxygen was removed therefrom by purging with nitrogen. Then 600 gm of a monomer mixture consisting of 2,400 gm of vinyl acetate and 3,600 gm of 2-ethylhexyl acrylate were added while stirring. The nitrogen was displaced with ethylene and an ethylene pressure of 50 bar was applied. By pumping in 50 cm$^3$ of a solution of 40 gm of ammonium persulfate in 500 gm of water and 50 cm$^3$ of a solution of 20 gm of sodium formaldehyde sulfoxylate in 500 gm of water, the polymerization was started.

After the start, the two metered additions were continued at the rate of 50 cm$^3$/hr. Twenty minutes after the start of polymerization, the remaining monomer mixture was added at a rate of 800 cm$^3$/hr. In addition a metered addition (C) consisting of 240 gm of acrylamide, 120 gm of a polyvinyl alcohol having a viscosity of 5 mPa.s (4%) and a degree of hydrolysis of 100, 70 gm of a sodium lauryl polyethylene glycol ether sulfate (with 3 mols of EO), and 10 cm$^3$ of ammonia (30%) in 1,000 cm$^3$ of water was effected at a rate of 200 cm$^3$/hr. After the metered addition of the monomer and the metered addition (C) have ended, the remaining amount of redox catalyst was allowed to flow in within one hour. Thirty minutes after this, the mixture was cooled and the dispersion was depressurized after the pH had been set to 7 with ammonia. A stable dispersion, which dried to a sticky film, was obtained. The glass transition temperature was −41° C.

Polymer Composition 3.2% acrylamide
18.0% ethylene
31.5% vinyl acetate
47.3% 2-ethylhexyl acrylate.

A coating of 25μ dry thickness on various sheets affixed to V4A-steel gave the values listed in Table 1.

TABLE 1

| | Example 6, Performed on Various Carrier Sheets | | | |
|---|---|---|---|---|
| Carrier Sheet | Tack (N/2.5 cm) | Peel Strength After a Bonding Duration of 8 Minutes | (N/2.5 cm) 24 Hours | Shear Strength (Minutes) |
| PVC; 0.1 mm thick, containing monomer plasticizers | 5.3 | 6 | 18 | >3,800 |
| PVC; 0.1 mm thick, containing polymer plasticizers | 3.3 | 5 | 8 | >1,000 |
| Polyester 0.036 mm thick | 3.5 | 4 | 7 | >1,000 |
| Polypropylene 0.03 mm thick | 4.1 | 5 | 8 | >1,000 |

EXAMPLE 7

In a reactor as described in Example 1, 250 gm of nonylphenol polyethylene glycol ether with 23 mols of ethylene oxide, 30 gm of sodium dodecylbenzenesulfonate, 100 gm of methacrylic acid, 100 gm of acrylamide and 120 gm of N-vinyl pyrrolidone were dissolved in 4,000 gm of water. After purging with nitrogen, 2,000 gm of vinyl acetate and 600 gm of 2-ethylhexyl acrylate were added. After displacing the nitrogen with ethylene, the mixture was heated to 60° C., and ethylene was applied at a pressure of 60 bar until saturation equilibrium was attained.

By simultaneous metering in of a solution of 30 gm of ammonium persulfate in 500 ml of water and a solution of 15 gm of sodium formaldehyde sulfoxylate in 500 ml of water at a rate of 150 ml/h, the polymerization was started. Fifteen minutes after the polymerization had started, a further 2,400 gm of 2-ethylhexyl acrylate were uniformly metered in over the course of 2.5 hours. The temperature of 60° C. was maintained for 1.5 hours; then the mixture was depressurized and introduced into a 30-liter stirring vessel and the remaining ethylene was removed by the application of a slight reduced pressure, while stirring. A stable plastics dispersion having a viscosity of 300 mPa.s and a solids content of 58% was obtained. The ethylene content of the polymer was 20% by weight, and the K-value was 92. The glass transition temperature was −46° C. The dispersion dried to an extremely sticky film having good cohesion.

Polymer Composition 45.0% 2-ethylhexyl acrylate
30.0% vinyl acetate
20.0% ethylene
1.5% acrylamide
1.5% methacrylic acid
1.9% N-vinyl pyrrolidone.

A coating of a film of 25μ dry thickness on a 100μ thick PVC sheet affixed to V4A-steel gave the following test values:
Tack 7.0 N/2.5 cm
Peel strength after 8 min. 4 N/2.5 cm
Peel strength after 24 hrs. 9.5 N/2.5 cm
Shear strength was 800 minutes,
Wet strength 7.5 N/2.5 cm.

The preceding specific embodiments are illustrative of the practice of the invention. It is to be understood, however, that other expedients known to those skilled in the art or disclosed herein, may be employed without departing from the spirit of the invention or the scope of the appended claims.

We claim:
1. A copolymerizate containing:
    (a) from 10% to 30% by weight of ethylene monomeric units,
    (b) from 29% to 69% by weight of monomeric units of an acrylic acid ester of an alkanol having from 4 to 12 carbon atoms,
    (c) from 20% to 55% by weight of vinyl acetate monomeric units,
    (d) from 0.2% to 8% by weight of monomeric units having the formula:

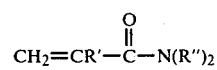

wherein R' is a member selected from the group consisting of hydrogen and methyl, and R" is hydrogen, and
    (e) from 0 to 12% by weight of other olefinically-unsaturated monomeric units copolymerizable with ethylene, vinyl acetate and alkyl acrylate and monomers as described in (d), said copolymerizate having a glass transition temperature of from −20° C. to −60° C. and a K-value according to Fikentscher, measured in tetrahydrofuran, of from 50 to 180.

2. The copolymerizate of claim 1 wherein component (a) is present in an amount of from 12% to 25% by weight, component (b) is present in an amount of from 29% to 60% by weight, component (c) is present in an amount of from 25% to 50% by weight and component (d) is present in an amount of from 0.2% to 3% by weight.

3. The copolymerizate of claim 1 wherein said component (e) is present in an amount of from 0.5% to 8% by weight.

4. The copolymerizate of claim 3 wherein said component (e) are monomeric units of monomers miscible in water in any ratio.

5. A pressure-sensitive adhesive containing an adhesive amount of the copolymerizate of claim 1.

6. A process for the production of the copolymerizate of claim 1 consisting of polymerizing components (b), (c), (d) and (e) in amounts sufficient to give the desired ratio of monomer units in the final copolymerizate, by free-radical initiation under ethylene pressure of from 20 to 120 bar at a temperature of from 10° C. to 90° C. for a time sufficient to complete the polymerization, and recovering said copolymerizate.

7. A process for the production of a copolymerizate containing:
 (a) from 10% to 30% by weight of ethylene monomeric units,
 (b) from 29% to 69% by weight of monomeric units of an acrylic acid ester of an alkanol having from 4 to 12 carbon atoms,
 (c) from 20% to 55% by weight of vinyl acetate monomeric units,
 (d) from 0.2% to 8% by weight of monomeric units having the formula:

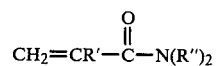

wherein R′ is a member selected from the group consisting of hydrogen and methyl, and R″ is hydrogen, and
 (e) from 0 to 12% by weight of other olefinically-unsaturated monomeric units copolymerizable with ethylene, vinyl acetate and alkyl acrylate and monomers as described in (d), said copolymerizate having a glass transition temperature of from −20° C. to −60° C. and a K-value according to Fikentscher, measured in tetrahydrofuran, of from 50 to 180, consisting of dispersing the monomeric units of components (b), (c), (d) and (e) in amounts sufficient to give the desired ratio of monomer units in the final copolymerizate in water in the presence of from 1.5% to 8% by weight, based on the monomers, of dispersants selected from the group consisting of emulsifiers, protective colloids, and mixtures thereof, polymerizing said dispersion in the presence of free-radical initiators under an ethylene pressure of from 20 to 120 bar and at a temperature of from 10° to 90° C. for a time sufficient to complete the polymerization and recovering said copolymerizate.

8. The process of claim 7 wherein the entire amount of component (d) is present prior to the commencement of polymerization.

9. The process of claim 8 wherein a part of components (b), (c) and (e) are charged after commencement of the polymerization in metered amounts.

10. The copolymerizate produced by the process of claim 7.

* * * * *